United States Patent [19]

Sugiyama et al.

[11] Patent Number: 5,050,397

[45] Date of Patent: Sep. 24, 1991

[54] AIR CONDITIONER APPARATUS WITH STARTING CONTROL FOR PARALLEL OPERATED COMPRESSORS BASED ON HIGH PRESSURE DETECTION

[75] Inventors: Akiyoshi Sugiyama; Tsunetoshi Inoue; Norihisa Hasegawa, all of Fuji, Japan

[73] Assignee: Kabushiki Kaisha Toshiba, Kawasaki, Japan

[21] Appl. No.: 540,273

[22] Filed: Jun. 19, 1990

[30] Foreign Application Priority Data

Jul. 28, 1989 [JP] Japan .................................. 1-195715

[51] Int. Cl.$^5$ ................................................ F25B 5/02
[52] U.S. Cl. .......................................... 62/175; 62/158; 62/228.3
[58] Field of Search .................... 62/175, 228.3, 228.4, 62/228.5, 510, 157, 158, 196.1, 196.2, 196.3; 236/1 EA

[56] References Cited

U.S. PATENT DOCUMENTS 4,932,220  6/1990  Inoue ...................................... 62/175

FOREIGN PATENT DOCUMENTS 0153334  7/1986  Japan ...................................... 62/175
64-70657  3/1989  Japan .
2166228  4/1986  United Kingdom .................. 62/175

Primary Examiner—Harry B. Tanner
Attorney, Agent, or Firm—Cushman, Darby & Cushman

[57] ABSTRACT

An outdoor unit includes at least two compressors and an outdoor heat exchanger commonly coupled thereto. An indoor unit is coupled to the outdoor unit to form a refrigeration cycle. The indoor unit includes at least an indoor heat exchanger and means for outputting required capacity data in accordance with an air-conditioning load with respect to the indoor heat exchanger. A pressure detector detects the high-pressure-side pressure of the refrigeration cycle. A first control section controls the number of compressors to be driven. The first control section sequentially starts the two compressors so as to control the compressors in a parallel operation state when the number of compressors to be driven is controlled to be two. A second control section includes a comparing portion for fetching pressure data from the pressure detector and comparing the pressure data with a reference value after the first compressor is started when the two compressors are to be sequentially started by the first control section, a portion for providing a command for allowing an operation start of the second compressor to the first control section when the pressure data is found to be lower than the reference value by the comparing portion, and means for providing a command for inhibiting an operation start of the second compressor to the first control section when the pressure data is found to be equal to or higher than the reference value by the comparing portion.

5 Claims, 5 Drawing Sheets

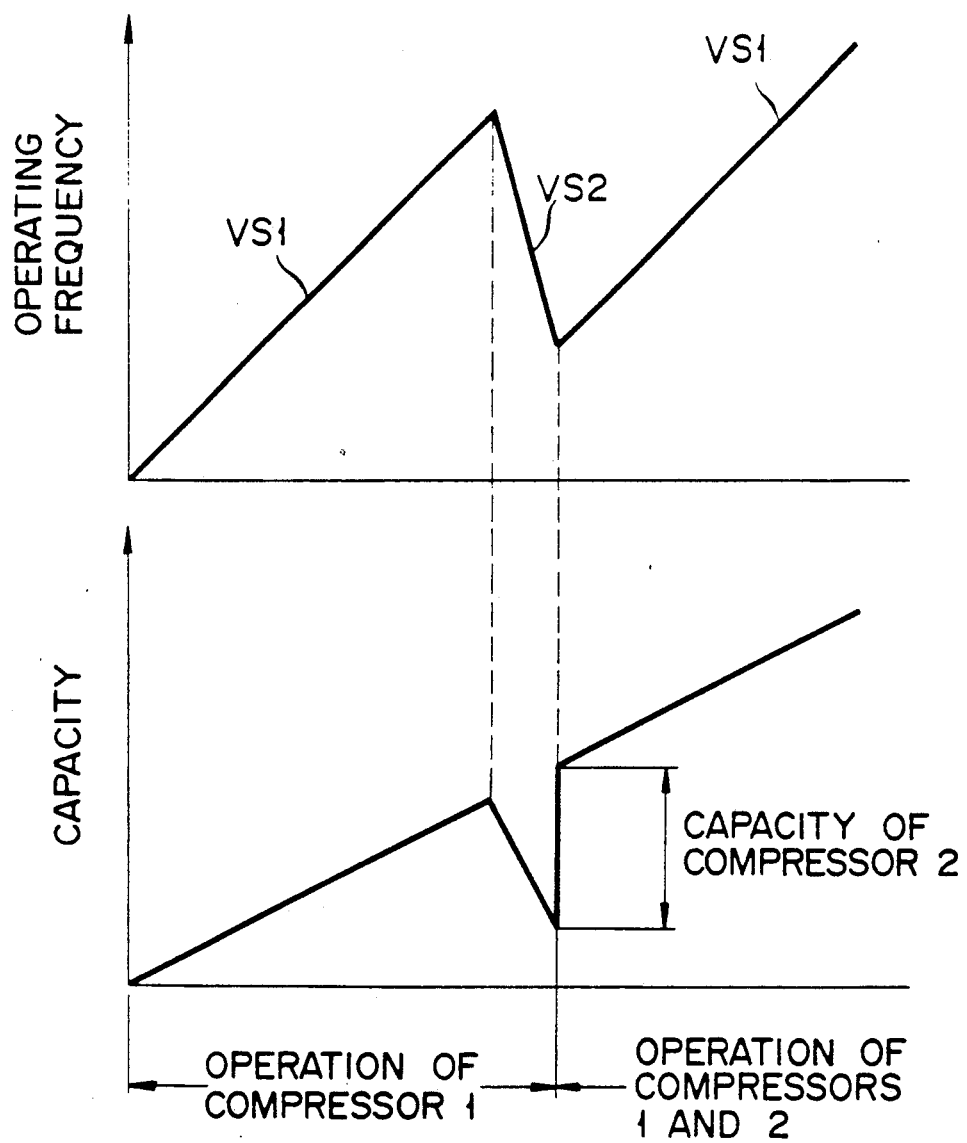
F I G. 4

AIR CONDITIONER APPARATUS WITH STARTING CONTROL FOR PARALLEL OPERATED COMPRESSORS BASED ON HIGH PRESSURE DETECTION

BACKGROUND OF THE INVENTION

1. Field of the Invention

The present invention generally relates to an air conditioner apparatus and, more particularly, to an air conditioner apparatus in which a refrigeration cycle is formed by coupling an outdoor unit having at least two compressors to at least one indoor unit.

2. Description of the Related Art

A conventional multi-type air conditioner apparatus is constituted by coupling an outdoor unit and a plurality of indoor units through a branch unit, as shown in FIG. 5 (prior art).

Referring to FIG. 5 (prior art), reference symbol A denotes an outdoor unit including a plurality of compressors, e.g., one (variable-capacity) compressor A1 driven at a variable frequency and a (fixed-capacity) compressor A2 driven by a commercial power source. The outdoor unit A is connected to a branch unit B. The branch unit B is connected to a plurality of indoor units $C_1$, $C_2$, and $C_3$.

The indoor units $C_1$, $C_2$, and $C_3$ respectively send required capacities corresponding to the respective air-conditioning loads to the branch unit B as frequency setting signals $f_1$, $f_2$, and $f_3$.

The branch unit B obtains the required capacities of the indoor units $C_1$, $C_2$, and $C_3$ from the sent frequency setting signals $f_1$, $f_2$, and $f_3$, and sends a frequency setting signal $f_0$ corresponding to the sum of the required capacities to the outdoor unit A.

The outdoor unit A controls the number of the compressors to be driven and their operating frequencies in accordance with the frequency setting signal $f_0$. When the number of the compressors to be driven is to be controlled, the order of priority is set such that the variable-capacity compressor A1 is started first, and the fixed-capacity compressor A2 is started next.

When a heating operation is to be started, the outdoor unit A operates the two compressors A1 and A2 so as to quickly perform hot starting of the heating operation. In addition, the outdoor unit A also operates the two compressors A1 and A2 during a defrosting operation in order to improve defrosting performance.

When a single-compressor operation using the compressor A1 is to be shifted to a double-compressor operation using the two compressors A1 and A2, the operating frequency of the variable-capacity compressor A1 which has already been driven is temporarily decreased, in consideration of oil equalization between the compressors A1 and A2, as shown in FIG. 6 (prior art). In this case, the change speed of the operating frequency is set to be a normal change speed VS1.

In the above-described conventional air conditioner apparatus, when a heating operation is started, a double-compressor operation using the two compressors is performed regardless of a loading state. For this reason, when at least one of the indoor units and outdoor units is in an overload state, the high-pressure-side pressure of the refrigeration cycle is abnormally increased, and a high-pressure protection release is activated to stop all the operations.

In order to prevent this, some apparatuses are designed to suppress an abnormal increase in high-pressure-side pressure by stopping the operation of the second compressor immediately when the high-pressure-side pressure reaches a preset value.

In this case, however, the second compressor is frequently turned on and off, and hence its service life is adversely affected by this repetitive ON/OFF operation.

In addition, when a single-compressor operation is to be shifted to a double-compressor operation, the operating frequency of the variable-capacity compressor is temporarily decreased. However, during this period, a capacity shortage causes discomfort of a user.

SUMMARY OF THE INVENTION

It is, therefore, an object of the present invention to provide a new and improved air conditioner apparatus with a starting control for parallel operated compressors according to a high pressure detection which can prevent an unnecessary operation stop due to high-pressure protection release at the start of heating operation, and can prevent adverse effects on the service life of the compressor.

It is another object of the present invention to provide a multi-type air conditioner system which can minimize a capacity shortage when a single-compressor operation is shifted to a double-compressor operation, thereby improving comfort of a user.

According to one aspect of the present invention, there is provided an air conditioner apparatus comprising:

an outdoor unit including at least two compressors and an outdoor heat exchanger commonly coupled thereto;

an indoor unit to be coupled to the outdoor unit so as to constitute a refrigeration cycle, the indoor unit including at least an indoor heat exchanger and means for outputting required capacity data in accordance with an air-conditioning load with respect to the indoor heat exchanger;

pressure detecting means for detecting a high-pressure-side pressure of the refrigeration cycle;

first control means for controlling the number of the compressors to be driven to be one or two, the first control means sequentially starting the two compressors so as to control the compressors in a parallel operation state when the number of the compressors to be driven is controlled to be two; and second control means including means for fetching pressure data from the pressure detecting means and comparing the pressure data with a reference value after the first compressor is started when the two compressors are to be sequentially started by the first control means, means for providing a command for allowing an operation start of the second compressor to the first control means when the pressure data is found to be lower than the reference value by the comparing means, and mean for providing a command for inhibiting an operation start of the second compressor to the first control means when the pressure data is found to be equal to or higher than the reference value by the comparing means.

According to another aspect of the present invention, there is provided a multi-type air conditioner apparatus comprising:

an outdoor unit including at least two compressors including at least a variable-capacity compressor and an outdoor heat exchanger coupled to the two compressors;

a plurality of indoor units each including at least an indoor heat exchanger and means for outputting required capacity data in accordance with an air-conditioning load, for at least a heating operation, of the indoor heat exchanger;

a distribution unit for parallel-coupling the plurality of indoor units to the outdoor unit so as to constitute a plurality of refrigeration cycles for at least heating operations, the distribution unit including a plurality of refrigerant flow rate control means for the respective refrigeration cycles;

pressure detecting means for detecting a high-pressure-side pressure of the refrigeration cycle;

first control means for supplying flow rate control commands to the refrigerant flow rate control means of the distribution unit, respectively, in accordance with required capacity data from the plurality of indoor units, and for controlling the number of the compressors to be driven and an operating frequency of the variable-capacity compressor in accordance with sum data of the required capacity data;

second control means for sequentially starting the two compressors and controlling the compressors in a parallel operation state for a predetermined period of time when the heating operation is started; and third control means including means for fetching pressure data from the pressure detecting means and comparing the pressure data with a reference value after the first compressor is started when the two compressors are to be sequentially started by the second control means, means for providing a command for allowing an operation start of the second compressor to the second control means when the pressure data is found to be lower than the reference value by the comparing means, and means for providing a command for inhibiting an operation start of the second compressor to the second control means when the pressure data is found to be equal to or higher than the reference value by the comparing means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4 is graph showing changes in operating frequency of a variable-capacity compressor of the embodiment;

DETAILED DESCRIPTION OF THE PREFERRED EMBODIMENTS

Figure 1:
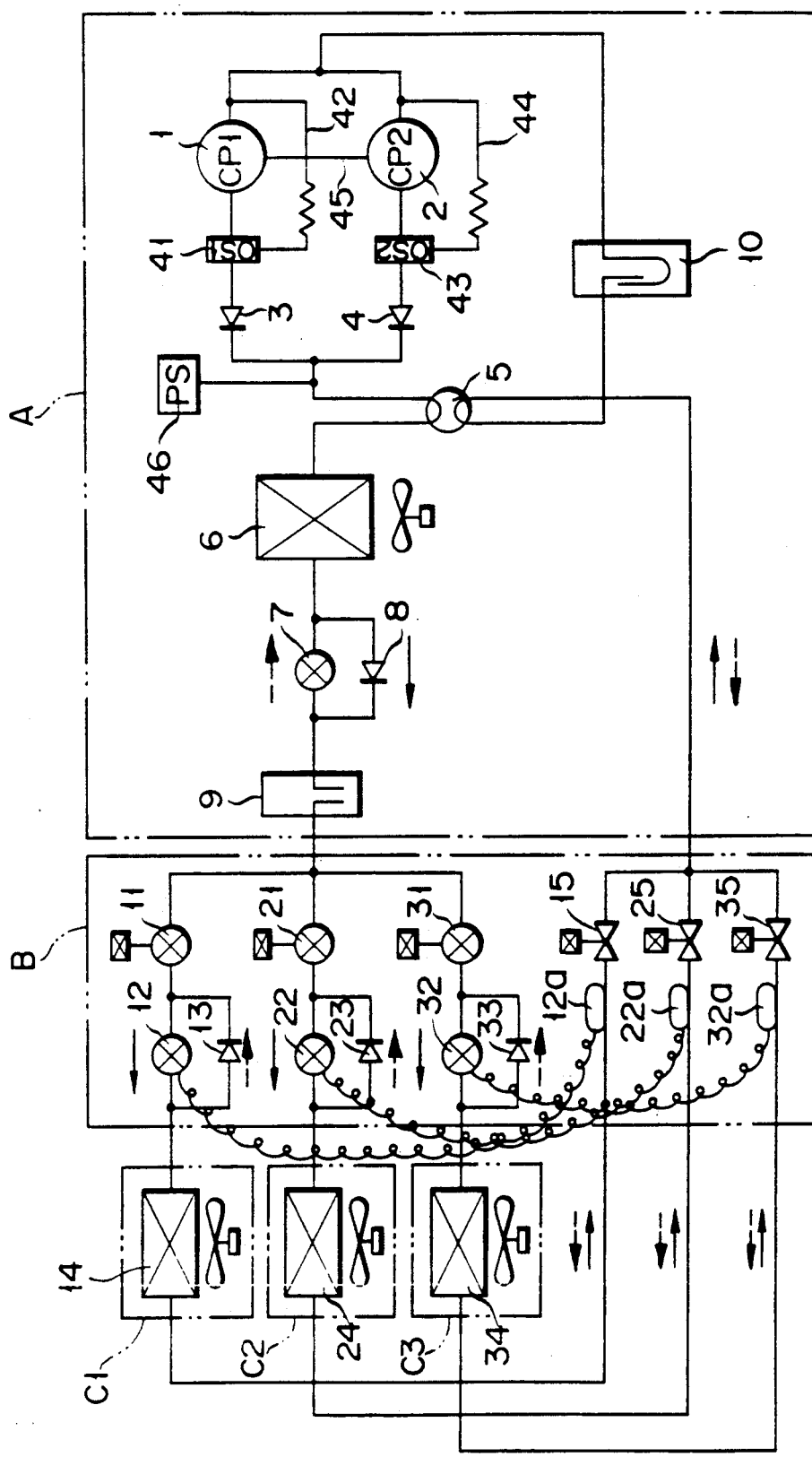
FIG. 1 is a view showing an arrangement of a refrigeration cycle to which an embodiment of the present invention is applied.

Reference will now be made in detail to a presently preferred embodiment of the invention as illustrated in the accompanying drawings, in which like reference characters designate like or corresponding parts throughout the several drawings.

FIG. 1 shows a refrigeration cycle system applied as the first embodiment of the present invention. An outdoor unit A includes two compressors, i.e., a variable-capacity compressor 1 and a fixed-capacity compressor 2 driven by a commercial power source. These compressors 1 and 2 are connected in parallel with each other through check valves 3 and 4.

The compressors 1 and 2, a 4-way valve 5, an outdoor heat exchanger 6, a parallel combination of a heating expansion valve 7 and a cooling cycle forming check valve 8, and a liquid tank 9 of the outdoor unit A sequentially communicate with electric flow control valves 11, 21, and 31, and parallel combinations of cooling expansion valves 12, 22, and 32 and heating cycle forming check valves 13, 23, and 33 of the branch unit B. In addition, this structure communicates with an accumulator 10 of the outdoor unit A through indoor heat exchangers 14, 24, and 34 and solenoid valves 15, 25, and 35 of a plurality of indoor units $C_1$, $C_2$, and $C_3$, thus constituting a heat pump type refrigeration cycle system.

The cooling expansion valves 12, 22, and 32 respectively include heat-sensitive cylinders 12a, 22a, and 32a. These heat-sensitive cylinders 12a, 22a, and 32a are respectively attached to gas-side refrigerant pipes between the indoor heat exchangers 14, 24, and 34 and the solenoid valves 15, 25, and 35.

That is, the indoor heat exchangers 14, 24, and 34 are arranged in parallel.

When a cooling operation is to be performed, a refrigerant flows in directions indicated by solid arrows in FIG. 1 to form a cooling cycle. When a heating operation to be performed, the refrigerant is flows in directions indicated by broken arrows in FIG. 1 upon switching operation of the 4-way valve 5 so as to constitute a heating cycle.

An oil separator 41 is arranged in a pipe on the refrigerant discharge side of the compressor 1, and an oil bypass pipe 42 is arranged between the oil separator 41 and a pipe on the refrigerant suction side of the compressor 1. In addition, an oil separator 43 is arranged in a pipe on the refrigerant discharge side of the compressor 2, and an oil bypass pipe 44 is arranged between the oil separator 43 and a pipe on the refrigerant suction side of the compressor 2. An oil equalizing pipe 45 causes the casings of the compressors 1 and 2 to communicate with each other at their reference oil surface levels, and allows circulation of a lubricant oil.

A pressure sensor 46 as a pressure detecting means is mounted on a high-pressure side refrigerant pipe of the refrigeration cycle.

Figure 2:
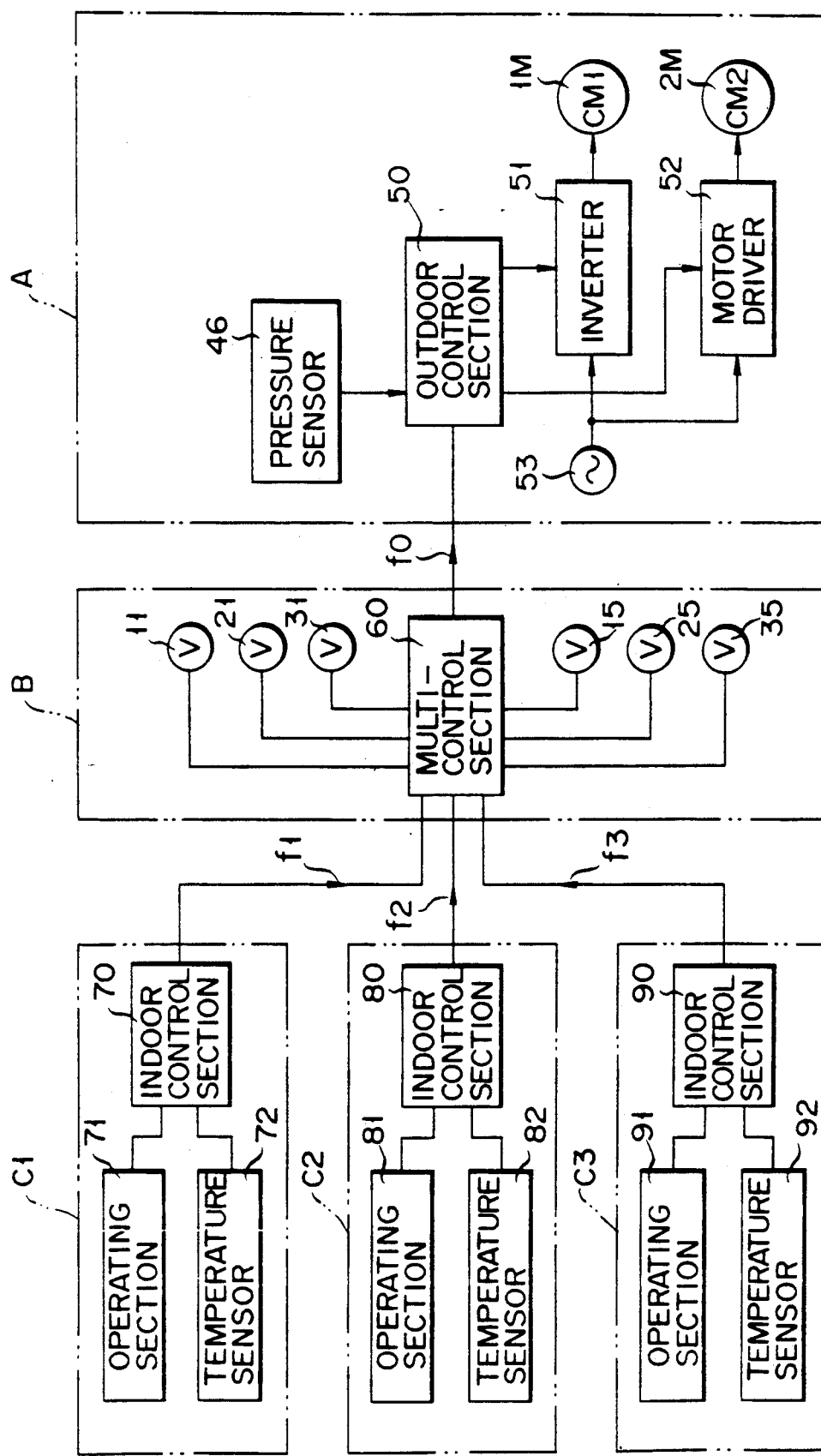
FIG. 2 is a block diagram showing an arrangement of a control circuit to which the embodiment is applied.

FIG. 2 shows a control circuit arranged in the refrigeration cycle system in FIG. 1.

The outdoor unit A includes an outdoor control section 50. The outdoor control section 50 is constituted by a microcomputer, its peripheral circuits, and the like, and is externally connected to the pressure sensor 46, an inverter 51, and a motor driver 52.

The inverter 51 rectifies a voltage from an AC power source 53. The inverter 51 then converts the voltage into an AC voltage having a predetermined frequency upon switching operation corresponding to a command from the outdoor control section 50, and applies it, as a driving power, to a motor 1M of the compressor 1.

The motor driver 52 applies a voltage from the AC power source 53, as a driving power, to a motor 2M of the fixed-capacity compressor 2 in response to a command from the outdoor control section 50.

The branch unit B includes a multi-control section 60. The multi-control section 60 is constituted by a microcomputer, its peripheral circuits, and the like, and is externally connected to the flow control valves 11, 21, and 31 and the solenoid valves 15, 25, and 35.

The indoor units $C_1$, $C_2$, and $C_3$ respectively include indoor control sections 70, 80, and 90. These indoor control sections are respectively constituted by microcomputers and their peripheral circuits, and are externally connected to operating sections 71, 81, and 91 and indoor temperature sensors 72, 82, and 92.

The outdoor control section 50, the multi-control section 60, and the indoor control sections 70, 80, and 90 respectively constitute first to fourth control sections. The first control section controls the number of the compressors 1 and 2 to be driven and the operating frequency of the compressor 1 in accordance with the required capacities of the indoor units $C_1$, $C_2$, and $C_3$. The second control section sequentially starts the respective compressors to perform a double-compressor operation when a heating operation is started. The third control section inhibits an operation shift from a single-compressor operation to a double-compressor operation at the start of a heating operation when a detection pressure of the pressure sensor 46 is equal to or higher than a preset value (e.g., 20 kg/cm$^2$G). The fourth control section temporarily decreases the operating frequency F of the compressor 1 at a change speed higher than a normal change speed when the number of the compressors 1 and 2 to be driven is changed.

An operation in the above-described arrangement will be described below.

Assume that cooling operations are currently performed in all the indoor units $C_1$, $C_2$, and $C_3$.

In this case, the indoor control section 70 of the indoor unit $C_1$ calculates an air-conditioning load given as a difference between a temperature detected by the indoor temperature sensor 72 and a preset temperature set by the operating section 71, and transfers a frequency setting signal $f_1$ corresponding to the temperature difference to the multi-control section 60 as a required cooling capacity.

Similarly, the indoor control sections 80 and 90 of the indoor units $C_2$ and $C_3$ transfer frequency setting signals $f_2$ and $f_3$ to the multi-control section 60 as required cooling capacities, respectively.

The multi-control section 60 obtains the required cooling capacities of the respective indoor units on the basis of the transferred frequency setting signals, and transfers a frequency setting signal $f_0$ corresponding to the sum of the transferred signals to the outdoor control section 50.

The outdoor control section 50 controls the number of the compressors 1 and 2 to be driven and their operating frequency (the output frequency of the inverter 51) F on the basis of the transferred frequency setting signal $F_0$.

In this case, the outdoor control section 50 shifts a single-compressor operation using only the compressor 1 to double-compressor operation using the compressors 1 and 2 with an increase in sum of the required cooling capacities.

In accordance with the required cooling capacities of the indoor units $C_1$, $C_2$, and $C_3$, the multi-control section 60 controls the openings of the corresponding flow control valves 11, 21, and 31 so as to control flow rates of the refrigerant to the indoor heat exchangers 14, 24, and 34, thus maintaining the degree of refrigerant heating at a predetermined value.

When a heating operation is to be performed, the flow of the refrigerant is reversed, and substantially the same operation control as described above is performed with respect to the compressors 1 and 2.

Figure 3:
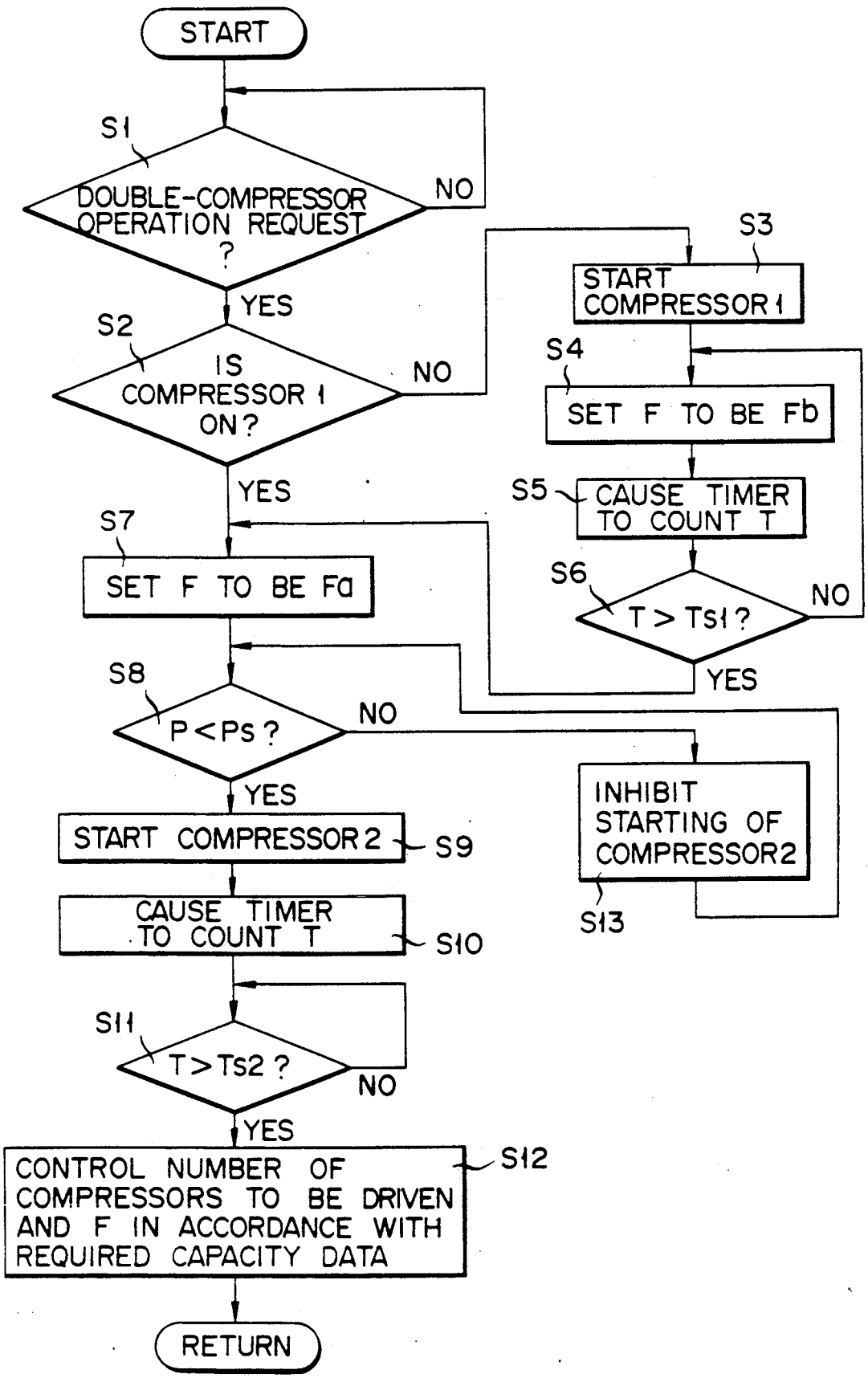
FIG. 3 is a flow chart for explaining an operation of the embodiment.
Figure 5:
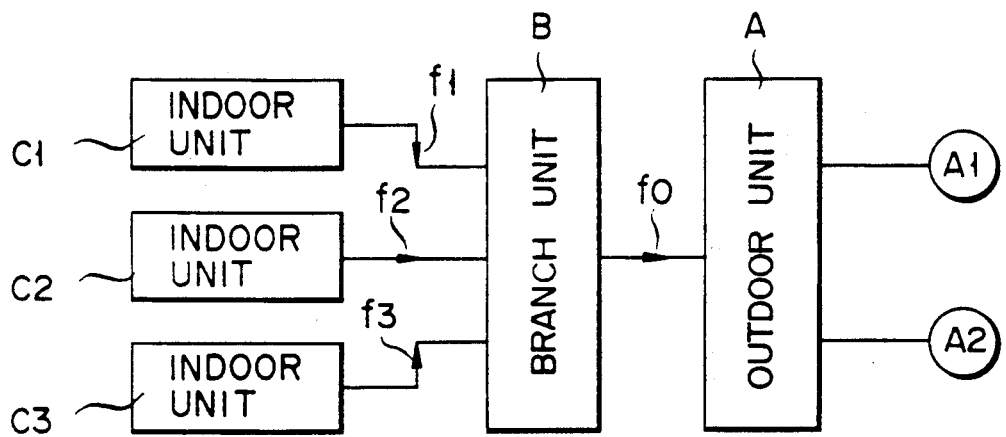
FIG. 5 (prior art) is a view showing a schematic arrangement of a conventional air conditioner apparatus.
Figure 6:
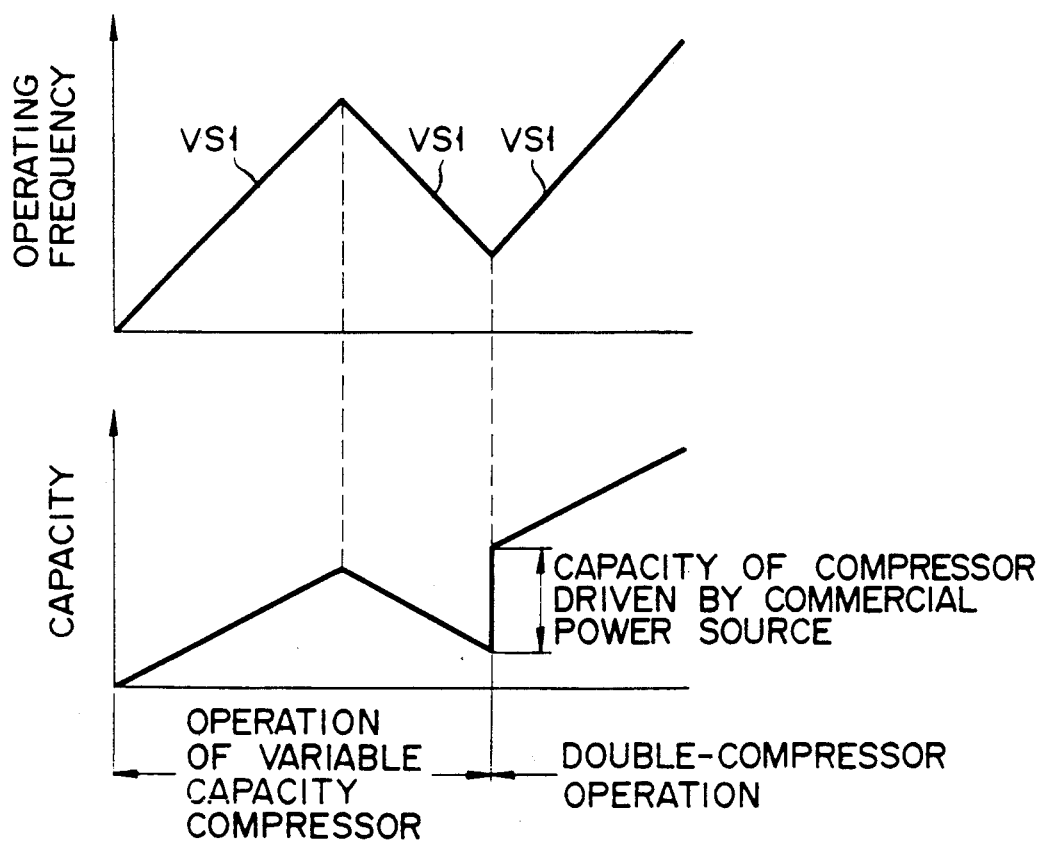
FIG. 6 (prior art) is a graph showing changes in operating frequency of a variable-capacity compressor in FIG. 5.

As shown in FIG. 3, when this heating operation is to be started, the outdoor control section 50 starts the compressor 1, sets the operating frequency F to be a frequency Fb, and holds this state for a predetermined time $T_{s1}$ based on the count value (T) of the internal timer. When the predetermined time $T_{s1}$ elapses, the operating frequency F of the compressor 1 is set to be a frequency Fa ($>$Fb) (steps S1 to S7 in FIG. 3).

After the compressor 1 is started, the outdoor control section 50 fetches a detection pressure (high-pressure side pressure) P of the pressure sensor 46. If the detection pressure P is lower than a preset value Ps, the control section 50 starts the compressor 2 (steps S8 and S9). After a predetermined period of time Ts2 elapse based on the count value of the internal timer, hot starting time of the heating operation can be reduced by parallel operation of the two compressors 1 and 2, the number of the compressors 1 and 2 to be driven and the operating frequency F of the compressor 1 are controlled on the basis of a frequency setting signal f0 as a required heating capacity from the indoor unit side (steps S10 –S12).

That is, when a heating operation is to be started, the compressors 1 and 2 are sequentially started to perform a double-compressor operation, thus shortening the time required for hot starting for a heating operation.

If, however, it is determined in step S8 that the detection pressure P of the pressure sensor 46 is equal to or higher than the preset value Ps, the outdoor control section 50 inhibits starting of the compressor 2, and continues a single-compressor operation using the compressor 1 (step S13).

That is, in an overload state, the control section 50 continues a single-compressor operation using the compressor 1 in order to prevent an abnormal increase in high-pressure-side pressure. This prevents an unnecessary operation stop by means of a high pressure protection release through a high-pressure switch (not shown). In addition, this prevents frequent ON/OFF operations of the compressor 2 and hence adverse effects on its service life.

When a single-compressor operation using the compressor 1 is to be shifted to a double-compressor operation using the compressors 1 and 2, the operating frequency F of the compressor 1 which has been operated at an operating frequency increasing at a normal change speed is temporarily decreased, as shown in FIG. 4, in consideration of an equalizing oil between the compressors 1 and 2. In this case, the change speed at which the operating frequency F is decreased is set to be a change speed VS2 higher than a normal change speed VS1. This shortens the time period of the decreased operating frequency F and minimize a capacity shortage, thereby improving comfort of a user.

The present invention is not limited to the above-described embodiment. For example, the number of indoor heat exchangers is not limited to three but may be arbitrarily set as needed.

As has been described above, since the air conditioner apparatus of the present invention comprises the pressure detecting section for detecting the high-pressure-side pressure of the refrigeration cycle, and the control section for inhibiting an operation shift from a single-compressor operation to a double-compressor operation when a detection pressure of the pressure detecting section is equal to or higher than a preset value, an unnecessary operation stop by means of the high-pressure protection release can be prevented, and adverse effects on the service life of the compressor can be prevented.

In addition, since the air conditioner apparatus of the present invention comprises the pressure detecting section for detecting the high-pressure-side pressure of the refrigeration cycle, the control section for sequentially starting the respective compressors to perform a double-compressor operation when a heating operation is started, and the control section for inhibiting an operation shift from a single-compressor operation to a double-compressor operation at the start of a heating operation when a detection pressure of the pressure detecting section is equal to or higher than a preset value, an unnecessary operation stop by means of the high-pressure protection release can be prevented, and adverse effects on the service life of the compressor can be prevented.

Moreover, since the air conditioner apparatus of the present invention comprises the control section for temporarily decreasing the operating frequency of the variable capacity compressor at a change speed higher than a normal change speed when the number of compressors to be driven is changed, a capacity shortage can be minimized when a single-compressor operation is shifted to a double-compressor operation, thus improving comfort of a user.

What is claimed is:

1. A multi-type air-conditioner apparatus comprising:
an outdoor unit comprising at least two compressors, at least one of said compressors being a variable-capacity compressor, and an outdoor heat exchanger coupled to said two compressors;
a plurality of indoor units each including at least one heat exchanger and means for outputting required capacity data in accordance with an air-conditioning load, for at least a heating operation, of said indoor heat exchanger;
a distribution unit for parallel-coupling said plurality of indoor units to said outdoor unit to form a plurality of refrigeration cycles for at least said heating operation, said distribution unit including a plurality of refrigerant flow rate control means for the respective refrigeration cycles;
pressure detecting means for detecting a high-pressure-side pressure of the refrigeration cycle;
first control means for supplying flow rate control commands to said refrigerant flow rate control means of said distribution unit, respectively, in accordance with said required capacity data for said heating operation from said plurality of indoor units, and for controlling a number of said compressors to be driven and an operating frequency of said variable-capacity compressor in accordance with a sum of the required capacity data;
second control means for sequentially starting said two compressors at intervals to shorten a rising time of said heating operation and controlling said compressors in a parallel operation state for a predetermined period of time regardless of the required capacity data when the heating operation is started; and
third control means comprising:
means for fetching pressure data from said pressure detecting means and comparing the pressure data with a reference value, after said first compressor is started and prior to starting said second compressor, when said two compressors are to be sequentially started at the intervals established by said second control means,
means for providing a command for allowing start of operation of said second compressor to said second control means when the pressure data is determined by said comparing means to be equal to or higher than the reference value, and
means for providing a command for inhibiting start of operation of said second compressor to said second control means when the pressure data is determined by said comparing means to be equal to or higher than the reference value,
said third control means eliminating stopping of the two compressors and frequent ON and OFF operation of said second compressor when said air-conditioner apparatus is overloaded and said high-pressure-side pressure is extraordinarily increased.

2. An apparatus according to claim 1, wherein said second control means includes means for starting said variable-capacity compressor prior to the other compressor when said two compressors are to be sequentially started.

3. An apparatus according to claim 2, wherein said second control means includes means for holding said variable-capacity compressor at a first operating frequency for a predetermined period of time when said compressor is started, and subsequently controlling said compressor at a second operating frequency higher than the first operating frequency.

4. An apparatus according to claim 2, wherein said second control means includes means for increasing an operating frequency of said variable-capacity compressor at a predetermined change speed for a predetermined period of time when said compressor is started, and subsequently starting the other compressor after the operating frequency is decreased at a change speed higher than the predetermined change speed for a predetermined period of time.

5. An apparatus according to claim 2, said other compressor being a fixed-capacity compressor.

* * * * *